April 6, 1943.  E. CHAPIN  2,315,893
DRAFTSMAN'S IMPLEMENT
Filed Feb. 11, 1942  2 Sheets-Sheet 1

Inventor

Eudell Chapin

By Clarence A. O'Brien
and Harvey B. Jacobson
Attorneys

April 6, 1943.  E. CHAPIN  2,315,893
DRAFTSMAN'S IMPLEMENT
Filed Feb. 11, 1942  2 Sheets-Sheet 2
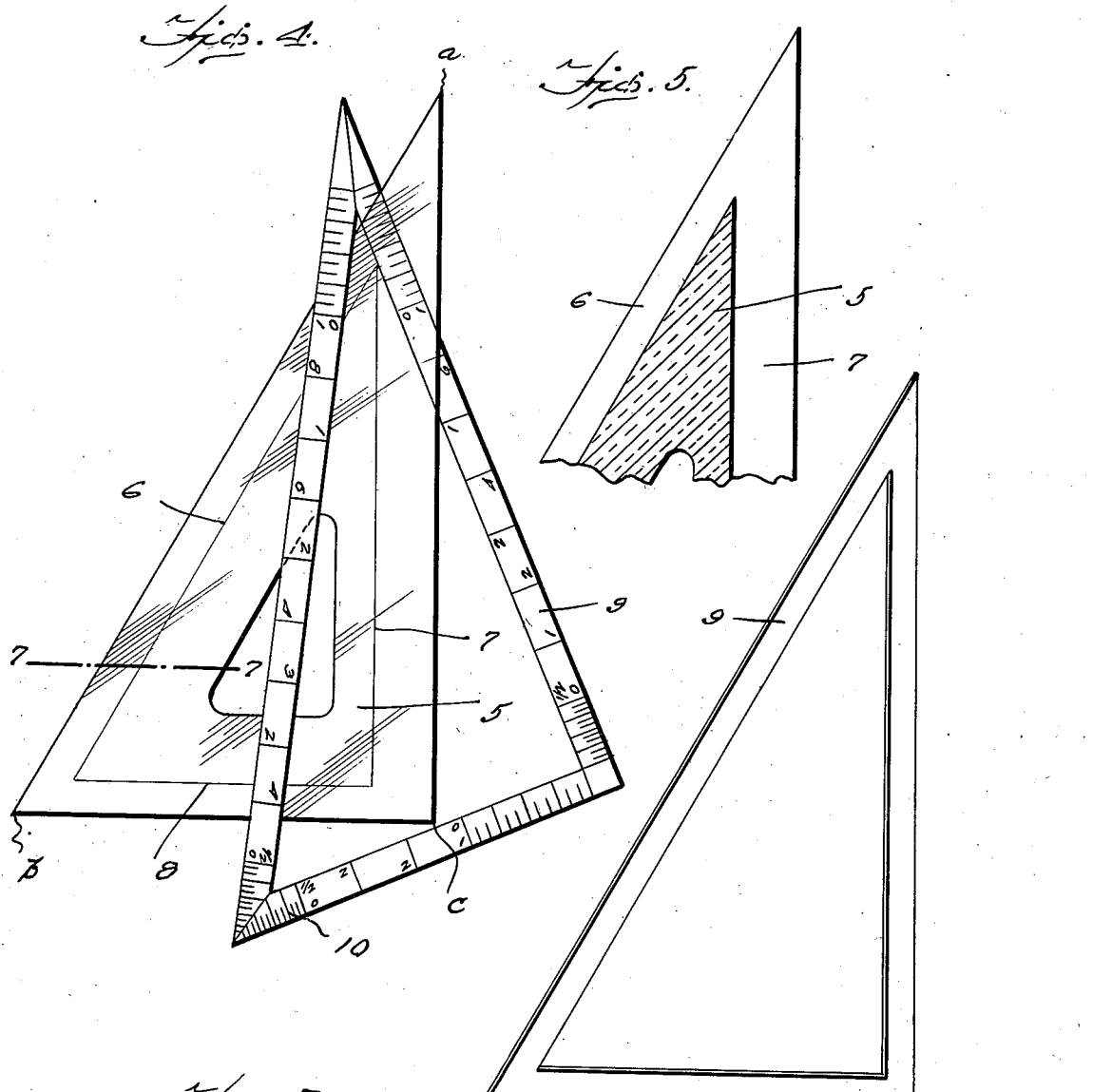
Inventor
Eudell Chapin
By Clarence A. O'Brien
and Harvey B. Jacobson
Attorneys Patented Apr. 6, 1943

2,315,893

UNITED STATES PATENT OFFICE 2,315,893

DRAFTSMAN'S IMPLEMENT

Eudell Chapin, Omaha, Nebr.

Application February 11, 1942, Serial No. 430,456

2 Claims. (Cl. 33—104)

This invention relates to new and useful improvements in draftsman's instrument and more particularly to a triangle.

The principal object of the present invention is to provide a triangle with an interchangeable scale which can be readily applied or removed whenever desired.

Other objects and advantages of the invention will become apparent to the reader of the following description.

In the drawings:

Figure 4 is a plan view showing the scale about to be engaged with the triangle.

Figure 5 is sectional view taken substantially on the line 5—5 of Figure 2 with the scale removed.

Figure 6 is a perspective view of the scale.

Figure 7 is an enlarged sectional view taken substantially on the line 7—7 of Figure 4.

Figure 1:
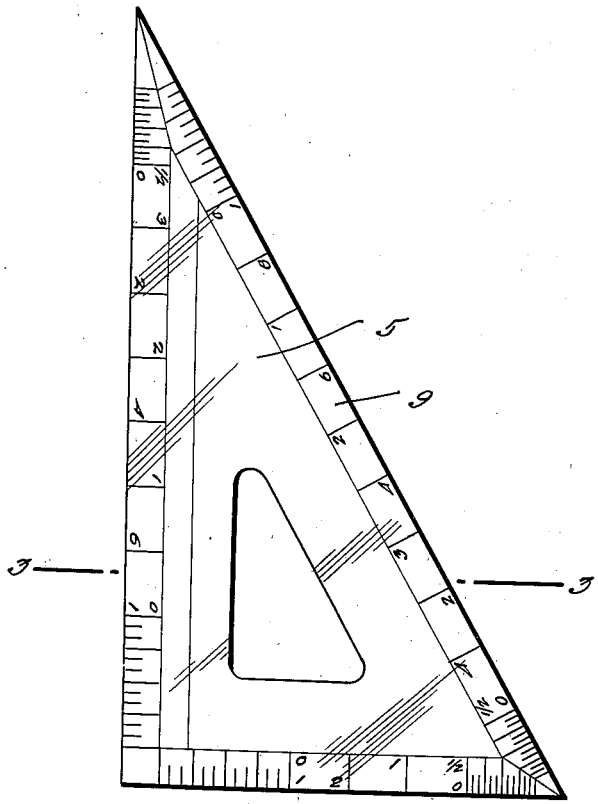
Figure 1 represents a plan view of the instrument assembled.
Figure 2:
Figure 2 is an edge elevational view.
Figure 3:
Figure 3 is a cross section on the line 3—3 of Figure 1.

Referring to the drawings wherein like numerals designate like parts, it can be seen that numeral 5 denotes a triangle of the usual, thirty, sixty degree type, the same being formed with a slot extending from its thirty degree angle end $a$ to its sixty degree angle end $b$, this slot being denoted by numeral 6 and preferably being about a quarter of an inch deep.

Extending from the end $a$ of the triangle to the remaining end $c$ is a deeper slot 7, this being about one-half of an inch deep and, of course, merging with the slot 6.

A third slot 8 is in the edge portion of the triangle between the ends $b$ and $c$ and this is about the same depth as the slot 6. It is observable in Figure 4 that these slots merge at the end portions of the triangle.

Numeral 9 denotes a triangular-shaped framelike scale having desirable graduations 10 thereon. The side members of this scale are approximately one-quarter of an inch wide to fit flush in both the slots 6 and 8.

The scale 9 is somewhat flexible so that its thirty degree end can be slipped into the slot representing the mergence of the slots 6 and 7 and the scale lowered to the position shown in Figure 4. At this point the scale can be shifted toward the left to engage the face portion of the scale 9 in the slot 8, this will result in the hypotenuse side of the triangle. With the parts in this position the hypotenuse side of the scale 9 can be forced into the slot 6, and now the scale is entirely within the slots of the triangle. Obviously, with the point of a screw driver, knife or some other implement, the scale can easily be dislodged for the purpose of replacement.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An instrument of the class described comprising a triangular plate having a continuous edge slot extending around the same in the plane of the plate, and a similarly shaped scale bearing frame of one-piece skeleton form and flexible material slidably fitting in said slot with the outer side edges thereof substantially flush with the outer side edges of the plate, said frame being slidable relative to said plate to retract one side thereof into the slot and project the other sides thereof out of said slot clear of the same for flexing out of the plane of the plate whereby the retracted side may be slid out of the slot and the frame thereby detached from the plate.

2. An instrument of the class described comprising a triangular plate having a continuous edge slot extending around the same in the plane of the plate, and a similarly shaped scale bearing frame of one-piece skeleton form and flexible material slidably fitting in said slot with the outer side edges thereof substantially flush with the outer side edges of the plate, said frame being slidable relative to said plate to retract one side thereof into the slot and project the other sides thereof out of said slot clear of the same for flexing out of the plane of the plate whereby the retracted side may be slid out of the slot and the frame thereby detached from the plate, said slot being deeper on one side of the plate than at the remaining sides to permit said one side of the frame to be retracted therein.

EUDELL CHAPIN.